United States Patent [19]

Endo

[11] Patent Number: 4,676,013

[45] Date of Patent: Jun. 30, 1987

[54] TREE TRANSPLANTING APPARATUS HAVING NON-PARALLEL LINK MECHANISM FOR DIGGING BLADE

[75] Inventor: Yoshimasa Endo, Yamanashi, Japan

[73] Assignee: Futaba Kogyo Yugen Kaisha, Japan

[21] Appl. No.: 825,461

[22] Filed: Feb. 3, 1986

Related U.S. Application Data

[62] Division of Ser. No. 723,171, Apr. 15, 1985, Pat. No. 4,602,444.

[30] Foreign Application Priority Data

May 15, 1984 [JP]  Japan ................................. 59-97096

[51]  Int. Cl.$^4$ ............................................. A01G 23/04
[52]  U.S. Cl. .................................... 37/2 R; 37/141 R
[58]  Field of Search ............ 414/697; 37/2 R, 118 R, 37/141 R

[56] References Cited

U.S. PATENT DOCUMENTS

| | | | |
|---|---|---|---|
| 2,614,476 | 10/1952 | Jennings | 37/2 R |
| 2,863,258 | 12/1958 | Gish | 37/2 R |
| 3,623,245 | 11/1971 | Adams | 37/2 R |
| 3,795,070 | 3/1974 | Bronson et al. | 37/141 R X |
| 3,864,852 | 2/1975 | Lochrie | 37/141 R |
| 4,101,040 | 7/1978 | Stolley | 414/697 |

FOREIGN PATENT DOCUMENTS 247695  7/1969  U.S.S.R. ............................... 37/2 R

Primary Examiner—Clifford D. Crowder
Attorney, Agent, or Firm—Wegner & Bretschneider

[57] ABSTRACT

An apparatus for transplanting trees comprising an elevating mechanism attached to an automatic travelling driving device and a digging-up device attached to said elevating device, wherein: said digging-up device includes a frame with a blade pivotally supported to it by a non-parallel link mechanism. The blade has an extensible member disposed at its free edge and extending outwardly from it. A hydraulic cylinder extends between the frame and the blade to move the blade, by means of the non-parallel link mechanism, between a position in which the extensible member is substantially vertical and a position in which it is substantially horizontal.

7 Claims, 16 Drawing Figures

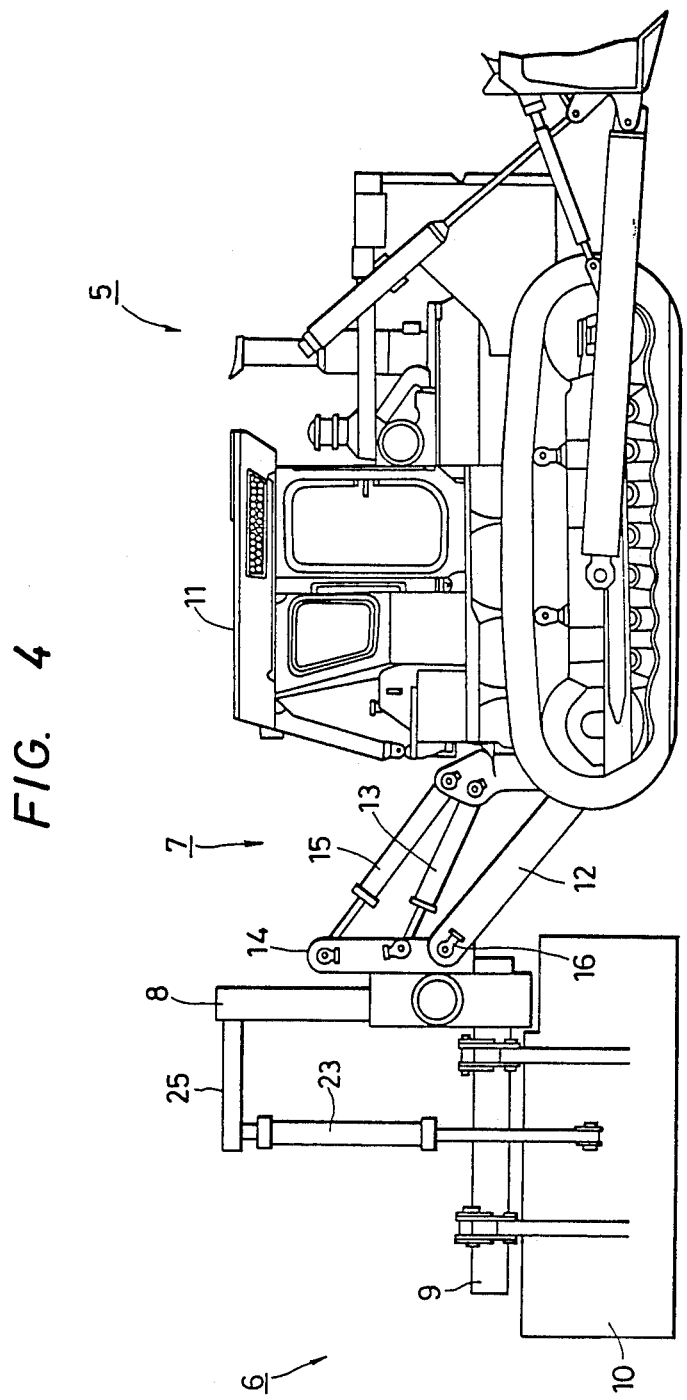

TREE TRANSPLANTING APPARATUS HAVING NON-PARALLEL LINK MECHANISM FOR
DIGGING BLADE

This application is a divisional of Ser. No. 723,171, filed Apr. 15, 1985, now U.S. Pat. No. 4,602,444.

FIELD OF THE INVENTION

The present invention relates to an apparatus for the transplantation of trees and, more specifically, to such an apparatus of the type wherein the ends of scooping means are opened and closed substantially horizontally.

BACKGROUND OF THE INVENTION

The transplantation of trees relies basically upon digging- up of trees, carrying of the thus dug-up trees to a given position and transplanting thereof. Of importance in this case is that no damage is caused to the roots of the tree. In other words, it is essential to prevent the roots from being torn off or disconnected from the surrounding ground by preventing any extra external force from being applied thereupon. For that reason, a ditch 1 is dug around the roots of the tree as illustrated in FIG. 1, when digging up the tree. After the portions of the roots surrounded by the ditch have been isolated from the remaining portions of the roots, the tree is pulled up, immediately followed by tying.

The aforesaid method is inefficient when the tree is of a large size. To solve the problems associates with this method it has been proposed to effect digging-up with the use of a power device and to carrying and transplant the tree with the use of a similar power device.

One example is, for instance, illustrated in FIG. 2. An automatic travelling apparatus such as a bulldozer includes a pair of left and right frames 2 and opposite digging scrapers 3 capable of being drivingly pivoted by a driving mechanism in the range from the positions located substantially just below the frames 2 to the positions at which they are closed substantially horizontally in a face-to-face manner (see Japanese Patent Publication No. 57-55371). When the tree is dug up with this apparatus, the digging scrapers 3 are first inserted into the ground surrounding the roots of the tree, and are then pivoted inwardly. According to this system, however, the digging scrapers 3 can cut off the portions of the roots spreading in the left and right directions, but cannot cut off the portions of the roots spreading in the backward, forward and downward directions. Even when the scrapers are pivoted from 3 to a position shown by 3', the tree is not lifted, since the tree is anchored to the ground by the portions of the roots spreading backwardly, forwardly and downwardly. Hence, the roots continue to be clamped between both scrapers 3 and 3, and eventually collapse.

When the scrapers 3 are pivoted from 3' to 3", the roots are forced up. However, the portions of the roots spreading forwardly, backwardly and downwardly are all inevitably torn off. In the end, the tree cannot be transplanted, since the roots collapse.

To transplant a tree T, a transplanting hole 4 is dug at a given location in the earth, and the tree T is slid down in that hole by opening the scrapers 3, as shown in FIG. 3. However, the tree T has a trunk and branches, although not illustrated, and is thus so heavy that its weight is applied upon the roots, when it is slid down in that hole, leading to partial or complete collapse of the roots. In addition, since there are no means for keeping the tree T upright, there is the possibility that the tree will fall.

SUMMARY OF THE INVENTION

An object of the present invention is to provide a transplanting apparatus which can dig up and transplant trees without damaging the roots thereof, and is free from the above-mentioned drawbacks.

BRIEF DESCRIPTION OF THE DRAWINGS

The above-mentioned and other objects and features of the present invention will become apparent from the following detailed description with reference to the accompanying drawings, which are given for the purpose of illustration alone, and in which:

FIG. 4 is a side view showing one embodiment of the present invention;

DESCRIPTION OF THE PREFERRED EMBODIMENTS OF THE INVENTION

Figure 1:
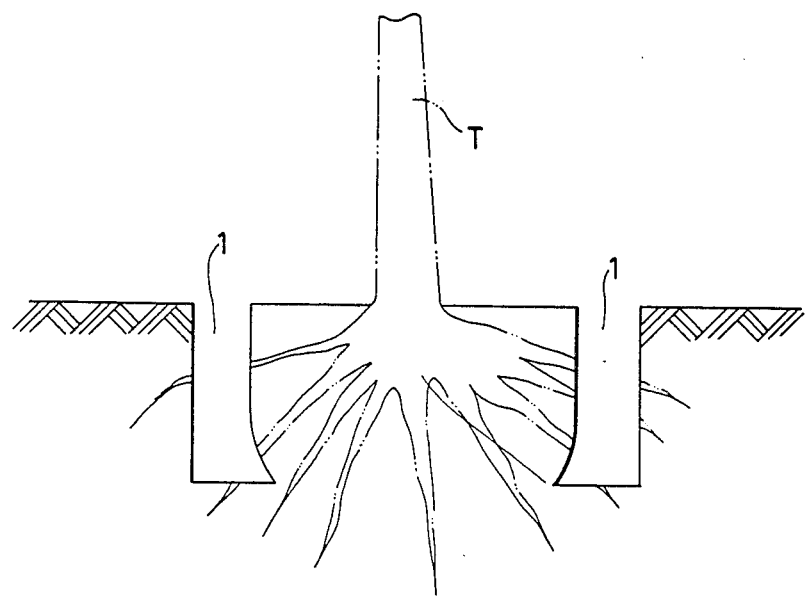
FIG. 1 is a front view illustrating the operation for digging up a tree.
Figure 2:
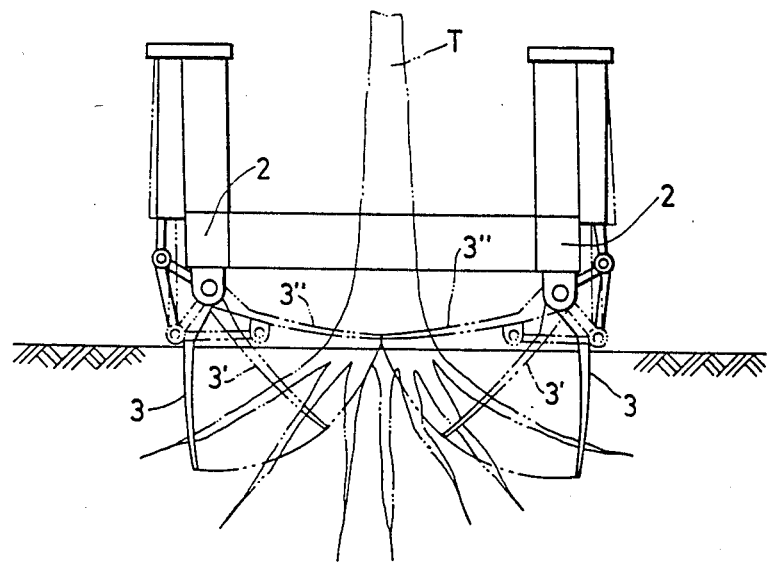
FIG. 2 is a front view showing a state in which a tree is dug up with the use of the conventional transplanting apparatus.
Figure 3:
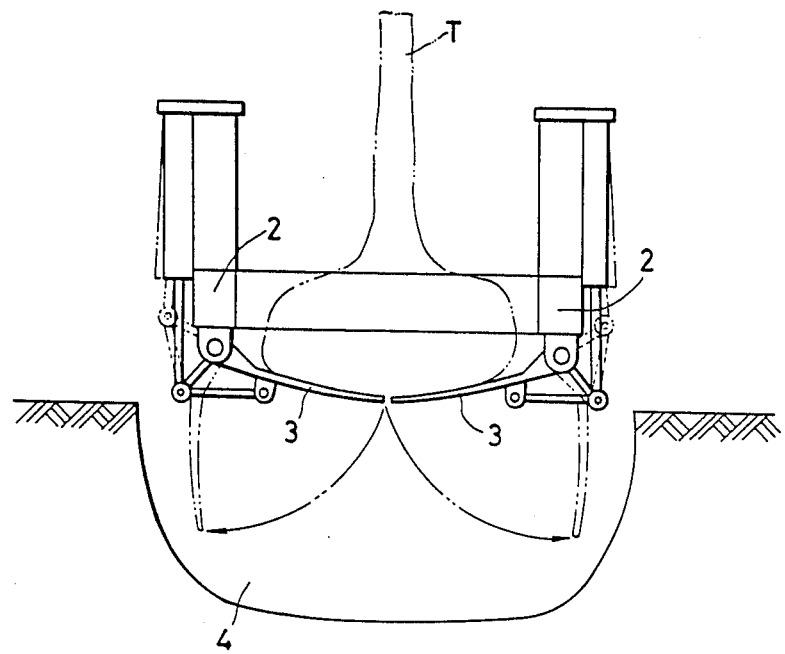
FIG. 3 is a front view showing a state in which that tree is transplanted.
Figure 5:
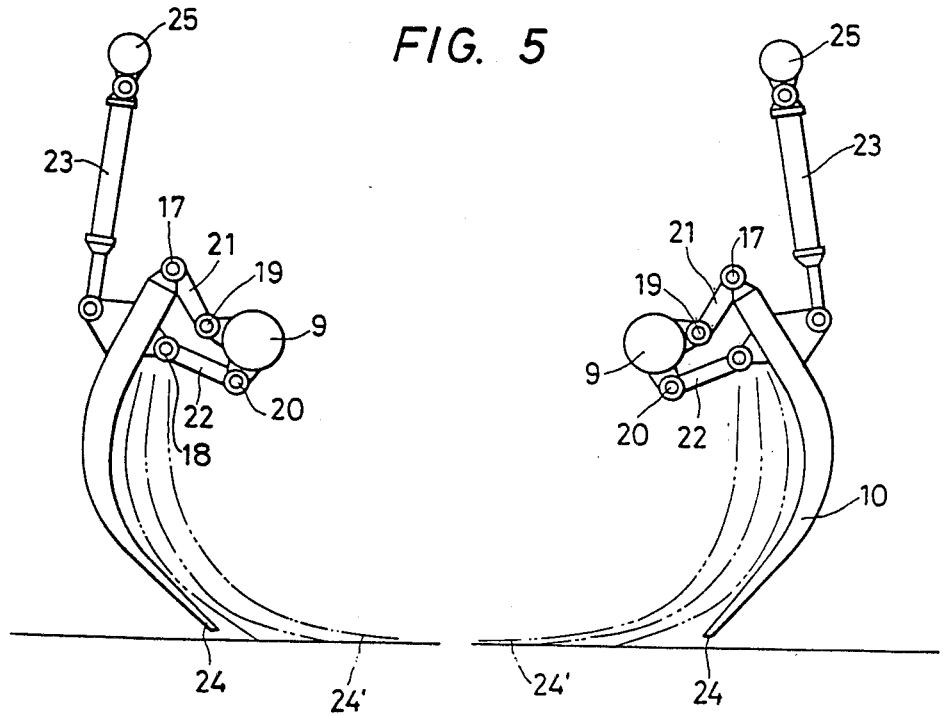
FIG. 5 is a front view showing part of that embodiment.
Figure 6:
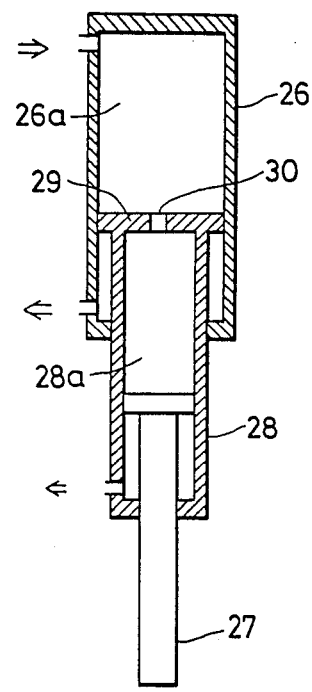
FIG. 6 is a longitudinally sectioned view showing one example of the hydraulic cylinder.

Referring now to FIGS. 4 to 6 inclusive, reference numeral 5 stands for a driving device, and 6 indicates a digging-up device. The digging-up device 6 is mounted on the driving device 5 through an elevating mechanism 7, and includes a pair of supporting rods 9 extending from the front face of a frame 8, to which scooping plates 10 are pivotally attached. The driving device 5 is adapted to supportingly ascend or descend the digging-up device 6 and to travel while carrying a tree. If that device has such function, no particular limitation is imposed upon the shape and structure thereof. For instance, use may be made of bulldozers, and the like. In the illustrated embodiment, a bulldozer is used as an example. The same applies to the digging-up device 6. That is, any mechanism capable of raising or lowering the digging-up device 6 is used as that mechanism. As an example, the illustrated mechanism includes a pair of lift arms 12 mounted on both sides of the front portion of a framework 11 and a hydraulic cylinder 13 located somewhat above it. A bracket 14 is attached to the free ends of both parts. A tilt cylinder 15 is connected between the framework 11 and the bracket 14, or between the lift arms 12 and the bracket 14. Thus, actuation of the hydraulic cylinder 13 causes up or down movement of the lift arms 12 centering around the points at which they are attached to the framework 11 (not shown). On the other hand, actuation of the tilt cylinder 15 causes the bracket 14 to incline back and forth centering around the mounting pin 16 of the lift arm 12.

The digging-up device 6 is mounted in place by fixing the frame 8 to the above-mentioned bracket 14. The frame 8 includes a pair of left and right supporting rods 9 which extend forwardly, and the scooping plates 10 which are bent inwardly and gently. The scooping plate is designed to be pivotal relative to the supporting rods 9 for opening or closing. Each rod 9 is provided with pins 19 and 20. Connection is then made between the pin 19 and one point 17 on the top portion of the scooping plate 10 and the pin 20 and one point 18 on the inside of the scooping plate 10 by means of connecting rods 21 and 22. The number of such pins may be three or more.

Of great importance is herein the relative mounting positions of the connecting rods 21 and 22 with respect to the supporting rods 9 and the scooping plates 10. The pin 19 is located slantingly above the pin 20. This arrangement assures that the scooping plates 10 are pivoted at the top portions around the pins 19 simultaneously with pivotal movement of the mounting point 18 of the connecting rod 22 around the pins 20. Thus, the lower ends 24 of the scooping plates 10 are opened or closed along the substantially horizontal orbit.

Opening or closing of the scooping plates 10 is effected by the hydraulic cylinder. This is illustrated in FIGS. 4 and 5. A mounting rod 25 extends from the frame 8, and is connected with the head of a hydraulic cylinder 23. Further, the plunger of that cylinder is connected to one point on the top or outside portion of the scooping plates 10. It is to be understood that the frame 8 and the bracket 14 are not necessarily formed as separate bodies.

If a separately formed frame 8 is attachable to and detachable from the bracket 14, then the digging-up device is in the form of an attachment for the driving device. Alternatively, if both parts are formed in one united body, then the transplantation apparatus is exclusively used for its own purpose. What is herein essential is that the digging-up device is mounted in such a manner that it can be adjusted back and forth in respect of the angle of inclination to the lift arms 12.

Incidentally, a tree T has branches height, although not illustrated. When the mounting rods 25 are positioned at a height reaching such branches, there is a possibility that no transplantation work may be effected since the rods are blocked thereby.

FIG. 6 illustrates one embodiment designed to cope with such a case. The hydraulic cylinder 23 is of the multi-stage type wherein the cylinder is decreased in length without varying the apparent stroke of the plunger, whereby the mounting rods 25 are located at a lower position.

More specifically, reference numeral 26 is a main cylinder, 27 a plunger and 28 is a sub-cylinder. The sub-cylinder 28 serves as a plunger with respect to the main cylinder 26, and acts as a cylinder with respect to the plunger 27. The sub-cylinder is telescopically inserted into the main cylinder 26, and includes a working face 29 provided therein with a small opening 30, through which the working chamber 26a of the main cylinder 26 communicates with the working chamber 28a of the sub-cylinder 28. This arrangement ensures that the apparent stroke of the plunger 27 is defined in terms of the sum of the stroke of the plunger 27 with respect to the sub-cylinder 28 and the stroke of the sub-cylinder 28 with respect to the main cylinder 26, and the length of the main cylinder 26 is given by about half the apparent stroke of the plunger 27. Thus, the use of the hydraulic cylinder as mentioned above allows the mounting positions of the rods 25 to be lowered by a reduction in the length of the cylinder.

Figure 7:
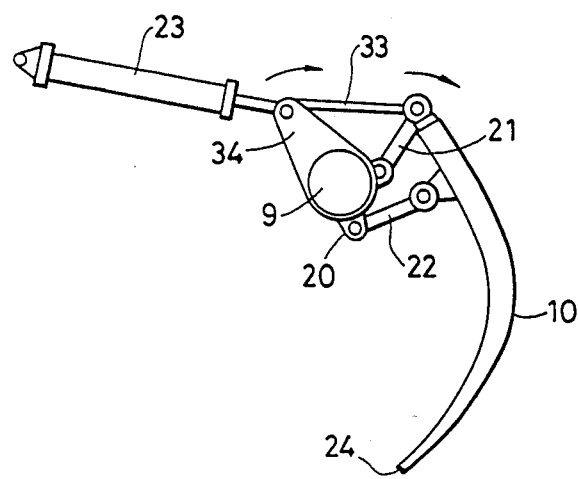
FIG. 7 is a front view showing part of another embodiment of the present invention.

FIG. 7 illustrates another embodiment wherein a hydraulic cylinder is tilted to reduce further the height of the frame 8. A rotary member 34 is rotatably mounted on the supporting rod 9, and a rod 33 is interposed between the rotary member 34 and the top portion of the scooping plate 10. A hydraulic cylinder 23 is mounted between one point on the frame 8 and the rotary member 34. Consequently, actuation of the hydraulic cylinder 23 causes rotation of the rotary member 34, the force of which is transmitted to the top portion of the scooping plate 10 through the rod 33, thus causing pivotal movement thereof.

Figure 8:
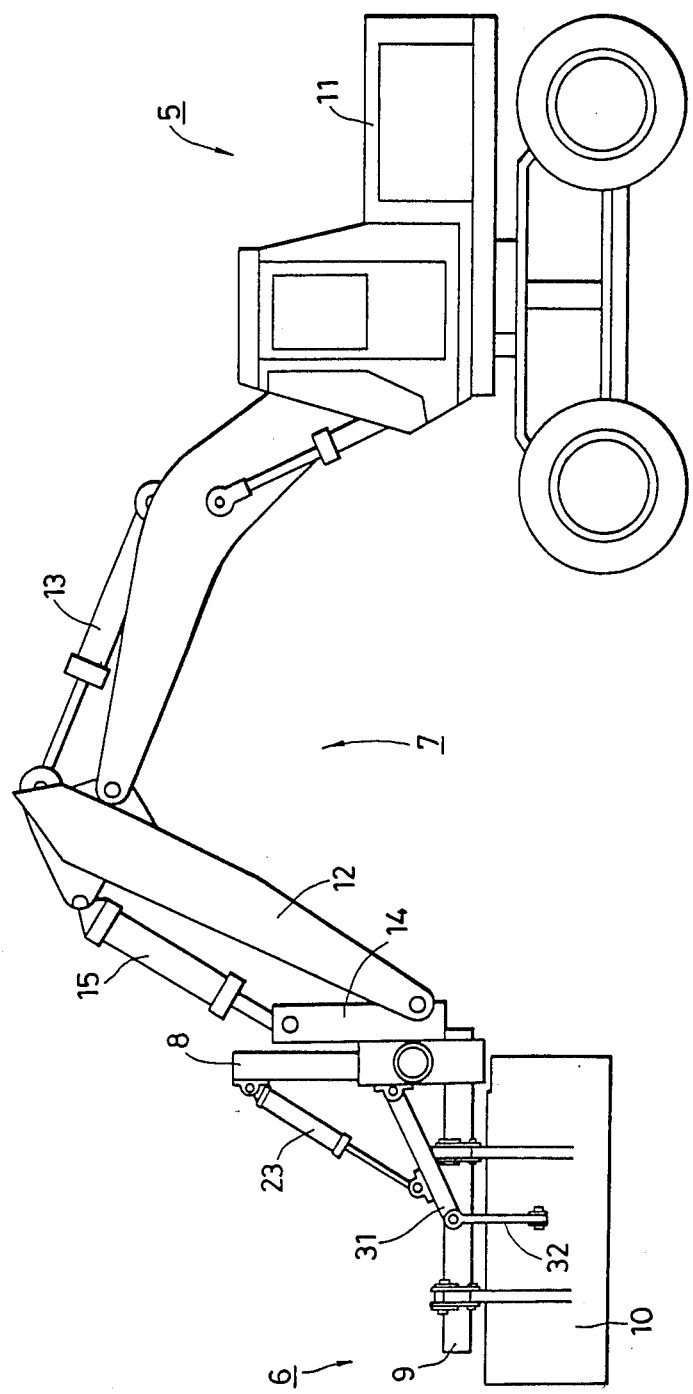
FIG. 8 is a side view showing a further embodiment of the present invention.

FIG. 8 illustrates a further embodiment wherein, between the frame 8 and one point on the top or outside portion of the scooping plate 10, there is interposed a linkage mechanism designed to be actuated by a hydraulic cylinder.

In this figure, reference numeral 31 is a keep arm, and 32 is a rod. These parts constitutes the so-called linkage mechanism, and are connected to each other in a bendable manner. The keep arm 31 is attached to one point on the frame 8, while the rod 32 is attached to one point on the top or outside portion of the scooping plate 10.

A hydraulic cylinder 23 is connected between the keep arm 31 and the frame 8. Accordingly, actuation of the hydraulic cylinder 23 causes that the keep arm 31 goes up and down centering around of the mounting point of the frame 8, thereby opening and closing the scooping plates 10.

In the following, reference will be made to the procedures for digging up a tree with the use of the apparatus according to the present invention.

First of all, a ditch 1 is dug around the roots of a tree T to cut off some of the roots. Then, the driving device 5 is driven while the scooping plates 10 are opened, to locate such plates 10 above the ditch 1. Subsequently, the digging-up device 6 is dropped down to press the scooping plates 10 down to near the bottom of the ditch 1, where the hydraulic cylinder 23 is actuated to close the scooping plates 10. Thereupon, the scooping plates 10 cut off the bottom of the roots of the tree T at the lower ends 24 thereof, and scoop up the remaining roots of the tree, followed by lifting-up of the digging-up device 6.

In this case, the scooping plates 10 pivot, as shown in FIG. 5, while the lower ends there move from 24 to a position shown by 24' along the substantially horizontal orbit. Thus, the lower ends 24 of the scooping plates 10 only serve to cut off the bottom of the roots without applying any pressure thereupon. It is thus very unlikely that the roots may collapse. In addition, since the lower ends of 24 of the scooping plates 10 are opened and closed along the substantially horizontal orbit without giving any force for forcing up the roots, there is no possibility that the tree T may be lifted up in this state.

For that reason, it is possible to secure the tree T to the frame 8 or the bracket 14 and keep it upright at the time when the scooping plates 10 are forced into the ditch 1. This assures that the tree is dug up.

This also holds for the transplantation of the tree T. After the lower ends 24 of the scooping plate have been moved down to the bottom of a transplanting hole 4, they are opened. Since the lower ends of the scooping plates are then opened along the horizontal orbit, it is very unlikely that the tree may fall. Hence, work can be done while the tree T is secured to the frame, etc., and kept upright, and there is no possibility that impact forces may be applied upon the roots of the tree by falling.

Figure 9:
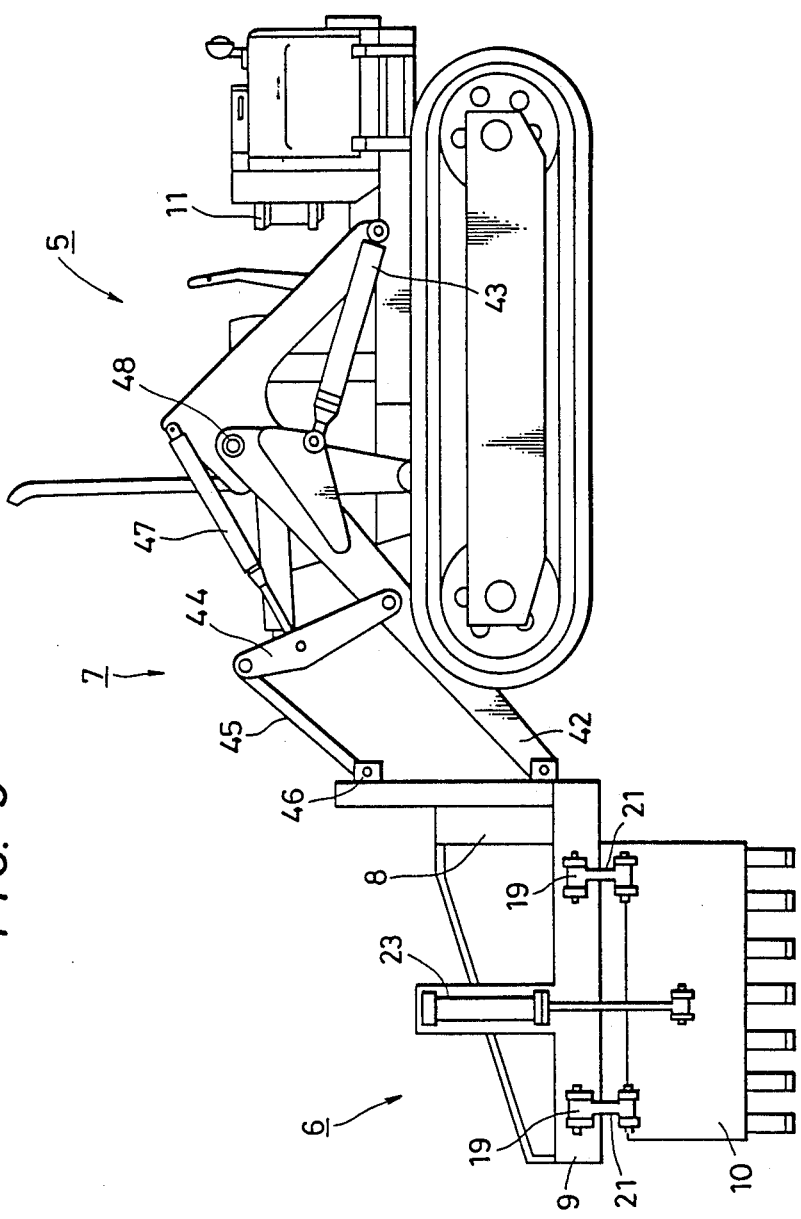
FIG. 9 is a side view showing a still further embodiment of the present invention.

As an example, FIG. 9 illustrates a bulldozer. A pair of left and right lift arms 42 are mounted on both sides of the upper portion of a framework 11. A hydraulic cylinder 43 is connected between one point on the lift arm 42 and one point on the framework 11, and the lift arm 42 pivots in a vertical plane around a pin 48. The lift arm 12 is provided at the intermediate portion with a tilt arm 44 to which a tilt rod 45 is connected. A bracket 46 is mounted on the tilt rod 45 and the lift arm 42. Further, a tilt cylinder 47 is connected between the intermediate portion of the tilt arm 44 and one point on the framework 11. Hence, actuation of the hydraulic cylinder 43 allows the bracket 46 to ascend and descend using the pin 48 as the fulcrum, while actuation of the tilt cylinder 47 permits it to tilt back and forth using a pin 19 as the fulcrum. A digging-up device 6 is mounted in place by securing a frame 8 to the aforesaid bracket 46. A pair of left and right supporting rods 9 extend forwardly from the frame 8, and are provided with inwardly and gently bent scooping plates 10. The scooping plates 10 are mounted in pivotal relation to the supporting rods 9, and are designed to be opened and closed with respect to each other.

In addition, the supporting rod 9 is provided at the upper portion with the hydraulic cylinder 23, which is in turn attached to a suitable point on the scooping plate 10.

In the embodiment illustrated, the scooping plates 10 are attached to the supporting rods 9 by means of two upper and lower connecting rods 21 and 22, so that the lower ends 24 thereof are designed to be opened and closed along the substantially horizontal orbit. The lower ends of the scooping plates serve to cut off the bottom of the roots, which cannot be substantially cut off manually, thereby separating the roots from the surrounding ground. Thus, there is no possibility that the roots of the tree T may be torn off in digging-up. In addition, since the scooping plates 10 are opened and closed without up and down movement of the tree T, the tree can be secured to the digging-up device 6 with no fear of the tree falling.

Figure 10:
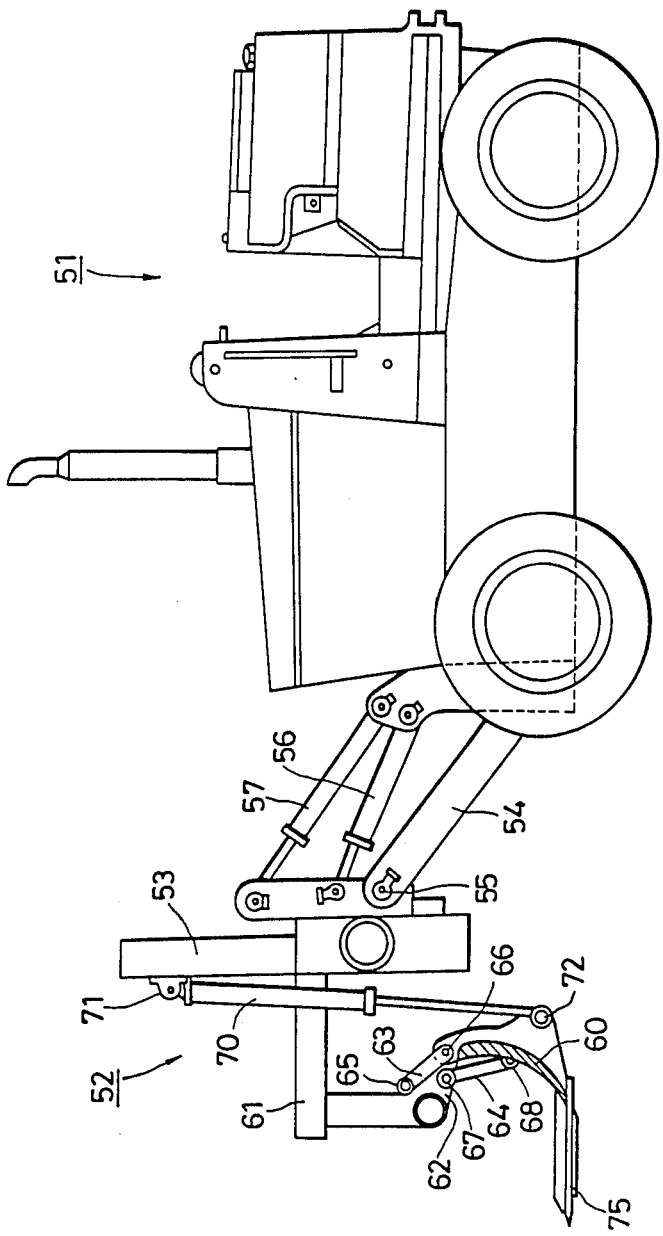
FIG. 10 is a side view showing a still another embodiment of the present invention.

FIG. 10 illustrates a still further embodiment of the present invention wherein a digging-up unit 52, one characteristic feature of the apparatus of the present invention, is applied to a wheeldozer for example. In this connection, when the scraper etc. provided at the end of the wheeldozer is replaced with attachments in the conventional manner of civil engineering works, it functions as a so-called dozer, a roller or the like. Thus, if the digging-up unit 52 is prepared as one attachment, the present invention is easily utilized. Referring briefly to the mounting manner of the digging-up unit 52, the frame 53 of the digging-up unit 52 is pivoted rotatably at the connection point 55 at the end of the arm 54 fitted slantwise upwards and extends rotatably from the front of the wheeldozer 51. Between the free end of the arm 54 and the wheeldozer 51, there is an elevating cylinder 56.

The arm 54 is pivoted by contraction of the elevating cylinder 56, whereby its free end is moved up and down. At a position above the elevating cylinder 56, a tilt cylinder 57 is disposed between the wheeldozer 51 and the frame 53. Extension and retraction of the tilt cylinder 57 causes the frame 53 of the unit 52 to tilt centering around the connecting point 55 of the arm 54. What is esential in such mechanisms is that they are of a structure wherein the digging-up unit can tilt or ascend and descend. The wheeldozer is also preferable in that it does no damage to the surface of turf in the preparation of a golf course. However, in a field where such care need not be taken, an endless type machine such as a bulldozer, etc. may be used. It is also possible to use a power unit such as a fork lift. In the following, the member for effecting direct digging-up in the digging-up unit 52 will be explained.

A digging-up blade shown by reference numeral 60 is pivotally mounted on the lower end of a sub-frame 61 extending forwardly from a frame 53. More specifically, a supporting bracket 62 is attached to the lower end of the sub-frame 61. A digging-up blade 60 is supported with a non-parallel linkage mechanism being disposed between it and the supporting bracket 62, said linkage mechanism comprising an upper link 63 and a lower link 64. It should be noted that reference numeral 65 is a pivot of the upper link located on the side of the supporting bracket, 66 a pivot of the upper link 63 located on the side of the digging-up blade, 67 a pivot of the lower link 64 located on the side of the supporting bracket 62, and 68 is a pivot of the lower link 64 located on the side of the digging-up blade 60. In the digging-up blade mounted through such a linkage mechanism, a main cylinder 70 is disposed between the top portion of the frame 53 and the rear side of the blade 60. The digging-up blade is shifted by contraction of the main cylinder 70. It should be noted that reference numeral 71 is a connecting fulcrum of the main cylinder 70 located on the side of the body thereof, and reference numeral 72 is a connecting fulcrum with respect to the digging-up blade located on the sliding member in the main cylinder 70. According to this embodiment of the present invention, the digging-up blade 60 has the following characteristic features. More specifically, reference numeral 75 stands for an extensible member slidably mounted on the scooping side of the digging-up blade 60. This member is drivingly extended and contracted back and forth by a slide cylinder 76 carried on the digging-up blade 60 at both its ends.

Figure 16:
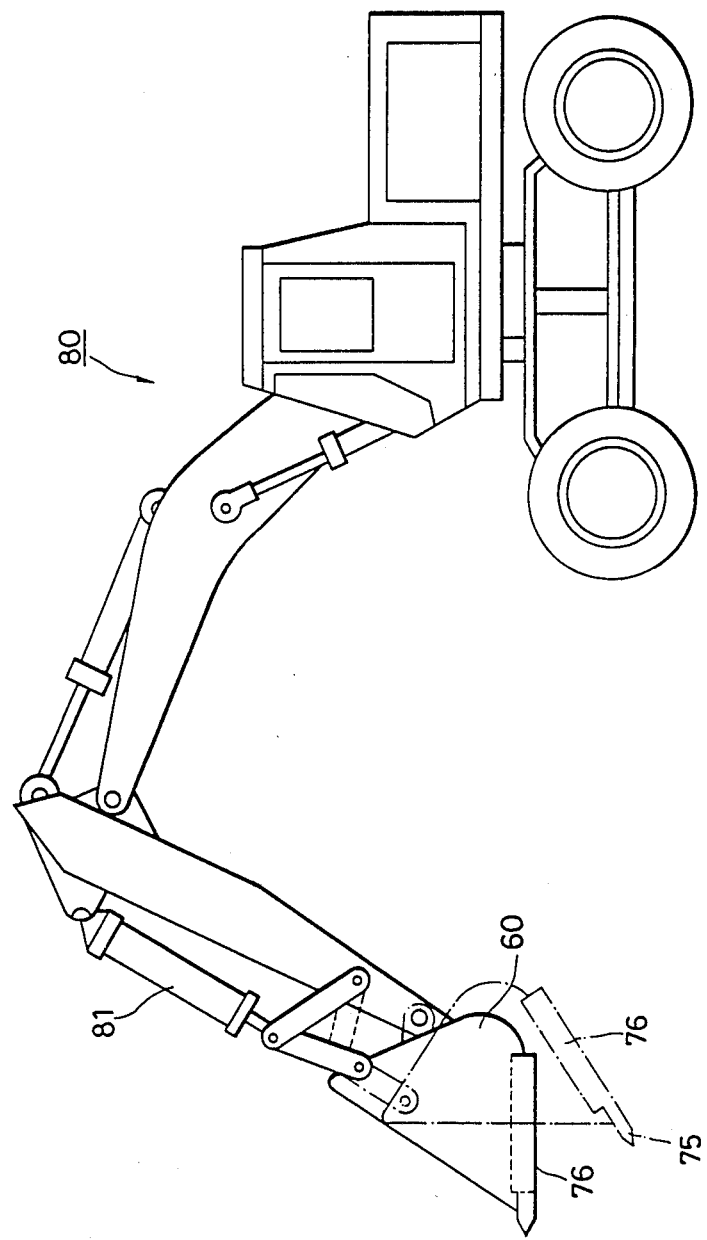
FIG. 16 is a side view illustrating a still further embodiment of the present invention.

What is essential in the embodiment of the present invention as described just above is that the extensible member 75 is provided to the digging-up blade 60. Such a structure is also applicable to the a still further embodiment of FIG. 16. That is to say, this embodiment is similar to a crane-like wheelroller. For example, the bucket of a wheelroller 80 is used as the digging-up blade 60, on the lower side of which an extensible member 75 is mounted, said member being designed to be shifted by a slide cylinder 76. Originally, the bucket functioning as the digging-up blade 60 is pivotally shifted at the free end of the arm 54 by a cylinder 81 through a V type link.

Figure 11:
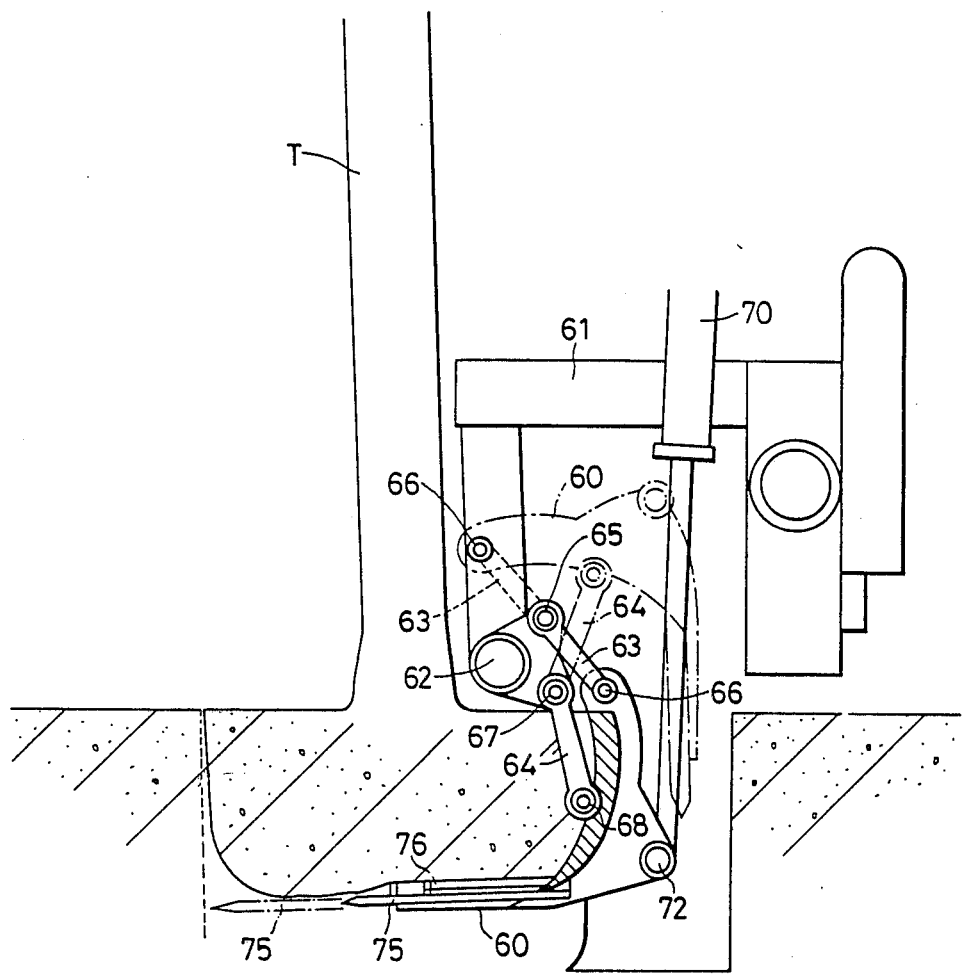
FIG. 11 is a side view illustrating the operation of FIG. 10.
Figure 12:
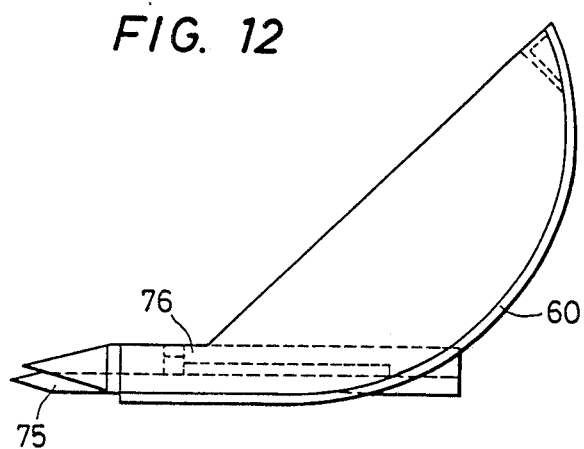
FIG. 12 is a side view showing the digging-up blade used in the present invention.
Figure 13:
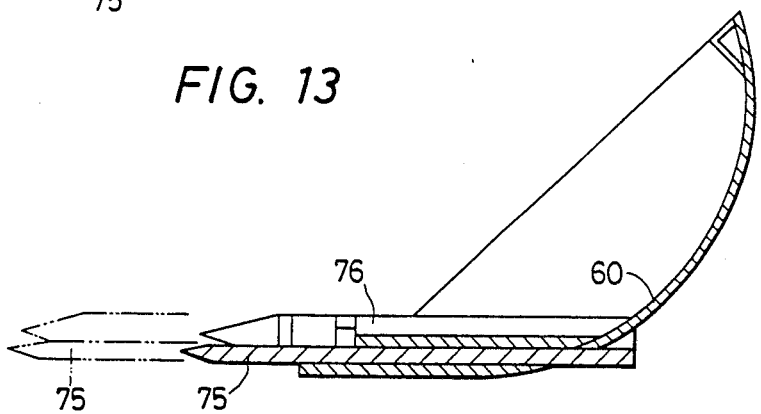
FIG. 13 is a sectioned view of the same.
Figure 14:
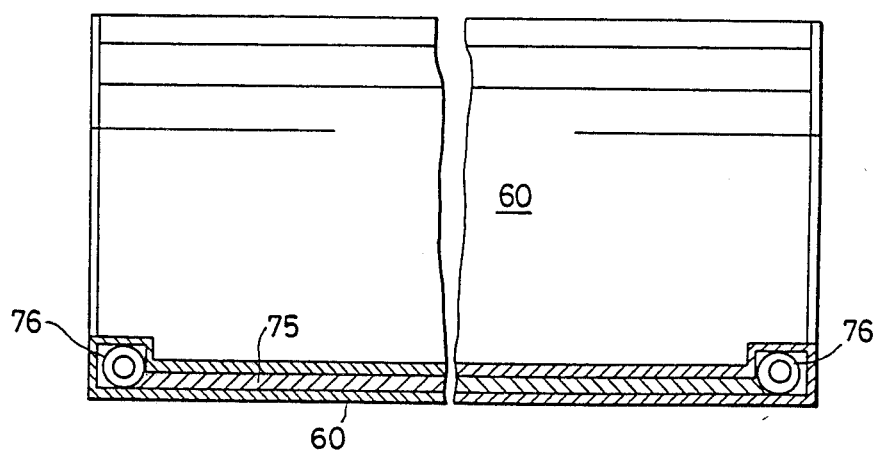
FIG. 14 is a longitudinally sectioned view of the same.
Figure 15:
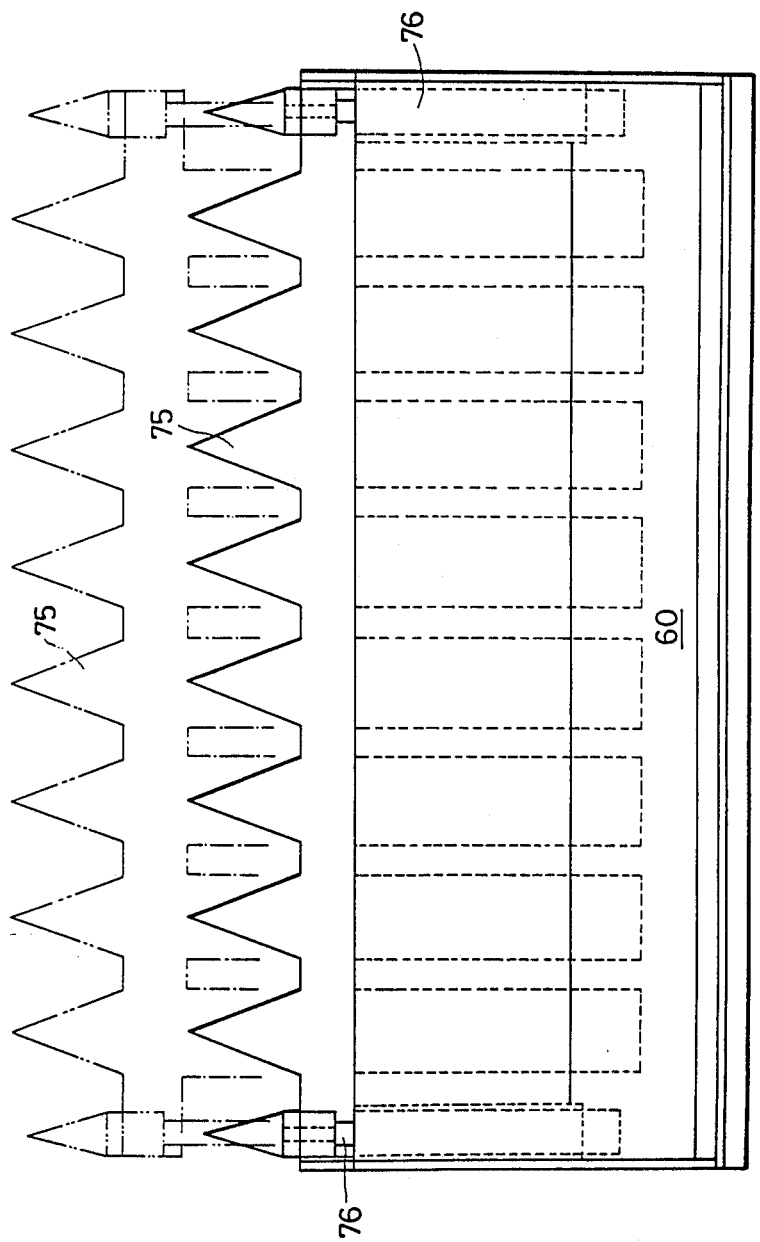
FIG. 15 is a plan view of the same.

This embodiment operates in the following manner. When the apparatus according to this embodiment is used, the ground surrounding a tree T is previously dug only in one side with a limited working space in mind. Thereafter, a wheeldozer, or the like is driven to bring the digging-up unit 52 near the tree T. Prior to the commencement of work, the main cylinder 70 is contracted to a sufficient extent to raise the digging-up blade. This state is illustrated in FIG. 11 by phantom lines. As the main cylinder 70 is extended from this state, the digging-up blade 60 is pressed down by the end of a sliding member of the main cylinder 70. At this time, due to the predetermined dimensions of the upper and lower links 63 and 64 forming the non-parallel linkage, the digging-up blade 60 is shifted successively from the state where it is horizontally reversed, say, the state where the free end of the blade 60 directs vertically and downwardly in such a manner that its free end moves horizontally. Thus, that blade bytes downwardly into the root of the tree T to be transplanted. In this manner, the free end of the blade 60 reaches half the depth of the roots of the tree T. Subsequent extension of the slide cylinder 76 causes the extensible member 75 to move forwardly. In this manner, the extensible member 75 passes just below the tree T, and reaches a position where sufficient digging-up takes place. Thereafter, the frame 53 is lifted up by suitable operation of the elevating cylinder 56, whereby the digging-up unit 52 is lifted up for digging-up of the tree T. In some cases, digging-up from one side may be insufficient, when the roots of the tree over a wide area. In this case, a suitable electrically powered saw or other like tool such as a shovel may be used to form a slit only around the roots for easy digging-up.

What is claimed is:

1. An apparatus for transplanting trees comprising a digging-up device adapted to be mounted to an automatic traveling device through an elevating mechanism, said digging-up device comprising:

(A) a substantially vertical frame supported by said elevating mechanism;
(B) a blade having an upper edge portion and a lower, free, edge, said blade supported by said frame at the upper edge portion thereof, and an extensible member disposed at the free edge of said blade and adapted to extend outwardly therefrom;
(C) said blade being mounted to pivot about a horizontal axis between a first position where said extensible member is essentially vertically disposed and a second position where said extensible member is essentially horizontally disposed;
wherein said blade is pivotally supported about said horizontal axis by means of a non-parallel link mechanism disposed between said blade and said frame, further comprising a hydraulic cylinder disposed between said blade and said frame for pivoting said blade between said first position and said second position.

2. An apparatus as defined in claim 1, wherein said extensible member has a width substantially equal to that of said blade.

3. An apparatus as defined in claim 1, wherein the distal edge of said extensible member is tapered at an acute angle.

4. An apparatus as defined in claim 1, wherein the distal edge of said extensible member is formed into a saw-toothed shape.

5. An apparatus as defined in claim 1, wherein said free end of said blade comprises an upper member and a lower member and said extensible member is disposed between said upper and lower members.

6. An apparatus as defined in claim 1, further comprising a slide cylinder for reciprocating said extensible member, said slide cylinder being interposed between said blade and said extensible member.

7. An apparatus as defined in claim 6, comprising a slide cylinder on each side of said blade.

* * * * *